United States Patent [19]

Pettigrew et al.

[11] Patent Number: 4,616,237

[45] Date of Patent: Oct. 7, 1986

[54] DATA STORAGE MEDIUM

[75] Inventors: Robert M. Pettigrew, Foxton; Victor C. Humberstone, Stapleford; Keith Gardner, Foxton, all of England

[73] Assignee: Pa Management Consultants, Ltd., London, England

[21] Appl. No.: 535,866

[22] Filed: Sep. 26, 1983

[30] Foreign Application Priority Data

Sep. 27, 1982 [GB] United Kingdom ............... 8227500

[51] Int. Cl.$^4$ ..................... G01D 15/34; B05D 3/00; B32B 15/04; G03C 1/00

[52] U.S. Cl. ............................ 346/135.1; 427/299; 427/304; 428/333; 428/612; 428/913; 430/495; 430/508; 430/945

[58] Field of Search ................... 346/135.1; 427/299, 427/304; 428/612, 333, 913; 430/495, 945, 508

[56] References Cited

U.S. PATENT DOCUMENTS

| 3,875,024 | 4/1975 | Picquendar et al. ............... 204/5 |
| 4,032,691 | 6/1977 | Kido et al. ........................ 428/304 |
| 4,245,229 | 1/1981 | Stephens ......................... 346/135.1 |
| 4,284,689 | 8/1981 | Craighead et al. ................ 428/620 |
| 4,318,112 | 3/1982 | Kivits et al. ..................... 346/135.1 |
| 4,344,816 | 8/1982 | Craighead et al. ................ 56/643 |
| 4,422,159 | 12/1983 | Craighead et al. ................ 365/127 |
| 4,426,437 | 1/1984 | Fisch et al. ...................... 430/166 X |

FOREIGN PATENT DOCUMENTS

| 2235574 | 7/1973 | Fed. Rep. of Germany . |
| 1328152 | 4/1963 | France . |
| 2497994 | 7/1982 | France . |
| 52-143838 | 11/1977 | Japan . |
| 54-107308 | 8/1979 | Japan . |
| 1462618 | 1/1977 | United Kingdom . |
| 1505344 | 3/1978 | United Kingdom . |
| 2061594 | 5/1981 | United Kingdom . |
| 2061595 | 5/1981 | United Kingdom . |

OTHER PUBLICATIONS

Clapham & Hutley, "Reduction of Lens Reflexion by the 'Moth Eye' Principle," Nature, vol. 244, pp. 281-282, 8-73.

Haller, Smith & Zory, "Optical Recording of Information of Microscopically Rough Substrates", IBM Tech. Disc. Bull., vol. 22, No. 3, p. 1234, 8-79.

Spiller et al, "Graded-Index AR Surfaces Produced by Ion Implantation on Plastic Materials", Applied Optics, vol. 19, No. 17, pp. 3022-3026, 9-80.

Craighead & Howard, "Microscopically Textured Optical Storage Media", Applied Physics Letters, vol. 39, No. 7, pp. 532-534, 10-81.

Craighead et al, "Textured Germanium Optical Storage Medium", Applied Physics Letters, vol. 40, No. 8, pp. 662-664, 4-82.

Craighead, "Optical Recording on Microscopically Textured Surfaces", CLEO, Conf. Dig., pp. 138-140, 4-82.

Wilson & Hutley, "The Optical Properties of 'Moth Eye' Antireflection Surfaces", Optica Acta, vol. 29, No. 7, pp. 993-1009, '82.

Primary Examiner—E. A. Goldberg
Assistant Examiner—Gerald E. Preston
Attorney, Agent, or Firm—Poms, Smith, Lande & Rose

[57] ABSTRACT

A data storage medium is provided which is suitable for production or replication by moulding, casting, embossing or a similar process against a tool. The data storage medium has a surface or a surface region which is strongly absorbent of at least a predetermined band of wavelengths of electromagnetic radiation. The surface or surface region includes a layer of a heat sensitive material which has a textured surface pattern the pitch of which is smaller than the shortest wavelength of the predetermined band of wavelengths, and the depth (peak-to-trough) of which is at least 100 nm. The surface pattern is free from undercutting, and can comprise an array of protuberances or one or more sets of grooves (which may be intersecting). The textured surface pattern is further coated with a thin film of a high-opacity material, e.g. gold, the thickness of the overcoating preferably being such as to give no more than 10% transmission of incident radiation.

A tool for use in producing such a data storage medium, and methods of using the tool, are also disclosed. The data storage medium may be prepared in blank form for use as the consumer desires, or it may be pre-recorded in part or in entirety.

32 Claims, 2 Drawing Figures

DATA STORAGE MEDIUM

BACKGROUND OF THE INVENTION

1. Field of the Invention

This invention relates to a data storage medium, a method of manufacturing a data storage medium, and a tool for use in the method.

2. Description of the Prior Art

One class of data storage techniques comprises selectively irradiating the surface of a storage medium, the medium being such that, when irradiated at sufficient intensity and duration, its properties are altered in some manner which is readily detectable. In this way data can be written onto and read from the storage medium. The writing irradiation may be electromagnetic or particulate. The advantage of electromagnetic writing radiation is that the writing (recording) operation need not be carried out in vacuum, while that of particulate writing radiation is that for any specified resolution, or data packing density, the depth of focus is much greater than for electromagnetic writing radiation.

When electromagnetic writing radiation is used, one of the difficulties frequently encountered is that the proportion of the incident energy absorbed by the data recording and storage medium may be small, and the energy required to alter detectably its properties may be large. Either or both of these restrictions may increase the energy required to write a detectable data spot on the data storage medium, which can increase the cost of the radiator or slow down the writing speed, or both.

Strongly absorbent surfaces have been prepared by producing a surface which is rough on a microscopic scale and in which the depth of the texture is large compared with its pitch. Such a surface is described by Spiller et al in Applied Optics Vo. 19, No. 17, Sept. 1, 1980 pp 3022-3026. However, the methods so far known for the production of such surfaces, such as implantation and etching, are inherently expensive. Furthermore, surfaces made by etching techniques cannot easily be replicated because etch pits tend to include undercut areas and are often relatively deep.

SUMMARY OF THE INVENTION

According to a first aspect of the present invention there is provided a data storage medium having a surface or a surface region which is strongly absorbent of at least a predetermined band of wavelengths of electromagnetic radiation, whereby the surface or surface region can be written-upon by such radiation, the said surface or surface region including a layer of heat sensitive material which has a textured surface pattern the pitch of which is smaller than the shortest wavelength within said predetermined band of wavelengths, and the depth (peak-to-trough) of which pattern is at least 100 nm, the textured surface pattern being free from undercutting so as to be suitable for production or replication by moulding, casting, embossing or similar process against a tool, and the textured surface pattern being overcoated with a thin film of a material which has a high opacity at the predetermined band of wavelengths.

In some embodiments of the invention, the entire surface of the data storage medium is formed with a textured surface pattern as defined above. In other embodiments, this structure is present only in one or more selected surface regions of the data storage medium.

The heat sensitive material is preferably a plastics material. Given that the textured surface pattern is free from undercutting, the use of the plastics materials helps in simplifying the production and replication processes required to manufacture the data storage media of this invention. A wide range of plastics may be used as the heat sensitive material; preferred plastics are those which undergo a large volume change when degraded from their polymeric state to monomeric species. Examples of such materials are poly(methylstyrene), polyformaldehyde, polymethacrylic acid and polymethacrylic esters, e.g. poly(methylmethacrylate). Other suitable plastics materials include polycarbonates, polyesters and poly(vinyl chloride). Techniques suitable for the production and replication of plastics materials incorporating the required textured surface pattern include injection moulding, compression moulding, casting and embossing.

A variety of different patterns may be used as the textured surface pattern. Usually, the pattern will consist of an arrangement of grooves or an array of protuberances, which may be in the form of a grating constituting a regular pattern. Where the pattern comprises grooves, these may be arranged concentrically, radially, in parallel or as a single spiral or as concentric spirals. The textured surface pattern may include two sets of superimposed grooves—if there are two superimposed sets of parallel grooves, the surface pattern will take the form of a crossed grating. With such a crossed grating, the two sets of grooves can conveniently intersect orthogonally, but this is by no means an essential requirement. Other multi-set configurations include (a) a set of concentric grooves with a superimposed set of radial grooves; (b) a single spiral groove with a superimposed set of radial grooves; and (c) two adjacent but non-intersecting arrays of parallel grooves.

Where the pattern comprises an array of protuberances, the pattern can be considered as sets of intersecting grooves. The textured surface pattern will therefore be described hereinafter by reference to grooves which grooves may be of square or triangular cross-section or of saw-toothed form. In general, however, the grooves are preferably of sinusoidal form. Particularly preferred are patterns made of parallel grooves of sinusoidal form either extending in one direction only (i.e. single sine wave form) or intersecting orthogonally (i.e. crossed sine wave form).

Insofar as patterns or gratings of single sine wave form are concerned, tests show that reflectivity from such a pattern using radiation with a polarisation perpendicular to the grooves is low, typically less than 10%, i.e., suitable for writing data. However, with radiation polarised parallel to the grooves, reflectivity is high (at least 30%) as is suitable for reading data.

The pitch of the grooves must be smaller than the shortest wavelengths within the predetermined band of wavelengths in order to achieve effective writing on the data storage medium. Preferably, the pitch of the structure is less than half the wavelength of the electromagnetic radiation which is to be used for writing. This radiation will usually be within the ultraviolet, visible or infrared regions of the electromagnetic spectrum.

The depth of the grooves should be at least 100 nm, and is preferably at least 200 nm. Where the textured surface pattern consists of a single set of grooves, good results have been obtained where the groove depth is about 400 nm and the pitch of the grooves is within the range 200-300 nm. For the avoidance of doubt, all references herein to the depth of a groove relate to the peak-to-trough depth. Thus if the groove is sinusoidal in form, the depth equals twice the amplitude of the sine wave.

The textured surface pattern is overcoated with a thin film of a high-opacity material (the opacity being determined within the predetermined band of wavelengths). The material used is preferably a metal, and the thickness of the overcoating is preferably such as to give a transmission of no more than about 20%, preferably no more than 10%, of incident radiation over the predetermined band of wavelengths. The metal used can be aluminium, chromium, copper, gold, silver, or titanium. The metals mentioned here are given by way of illustration only, and are not to be considered as exclusive.

It will be appreciated that a material of high opacity would produce a film which is opaque to the predetermined band of wavelengths if the film were of sufficient thickness. In the present invention, it is not essential for the film thickness to be sufficient to ensure zero transmission. Indeed, the film must be sufficiently thin that it does not deleteriously affect the form of the textured surface pattern.

Data storage media in accordance with the present invention are highly absorptive of incident electromagnetic radiation within the predetermined band of wavelengths. The absorption of radiation at the textured surface pattern on the data storage medium causes an observable change in the heat sensitive material. Thus selective irradiation of the textured surface pattern will result in local heating at the positions of incident radiation, thereby causing local changes in the heat sensitive material which served to distinguish the regions where radiation was incident from those regions where there was no incident radiation. The detectable change in the heat sensitive material can be caused by local blistering or ablation of the material, for example by degradation of a polymer to monomeric species, or by melting the plastic or any other method of permanently altering the physical state of the plastic. Such structural changes cause localized changes in the optical properties of the material.

The reading of information stored on a data storage medium of this invention will be effected by a technique appropriate to the nature of the changes in properties undergone by the heat sensitive material on writing. Where the heat sensitive material undergoes blistering or ablation as a result of absorption of incident radiation, reading can be performed by observing changes in reflectivity of the medium using a wavelength and/or intensity of electromagnetic radiation which itself is not significantly absorbed by the data storage medium. Changes in optical transmissivity may be used instead of changes in reflectivity.

According to a second aspect of the present invention there is provided a method of manufacturing a data storage medium as defined hereinabove, the method including producing said textured surface pattern by plastics moulding, casting, embossing or similar process against a tool.

According to a third aspect of the present invention there is provided a tool for use in producing a data storage medium according to the first aspect of the invention by a method according to the second aspect of the invention, the tool having a surface which is a negative image of said textured surface pattern. Methods of producing the pattern on the tool according to the third aspect of the invention are described hereinafter, by way of example.

According to a fourth aspect of the present invention, there is provided a pre-recorded data carrying medium formed by selective irradiation of a data storage medium of the invention, the pattern or patterns of irradiation being such as to permit the stored data to be regenerated in visual form.

The present invention enables a strongly absorbent data storage medium to be produced cheaply and easily by plastics moulding, casting, embossing or similar process employing a tool, and using mass-production techniques.

Preferred forms of the present invention may provide economically a data storage medium having a strongly absorbtive surface of low thermal capacity. In some examples there can be provided such a surface the properties of which can be altered by the absorption of only a small quantity of energy.

One technique for manufacturing a data storage medium in accordance with the present invention is as follows, starting with the production of the tool:
(1) A thin film of resist is deposited onto a smooth surface.
(2) The resist is exposed in a suitable pattern as already described.
(3) The resist is developed.
(4) A negative replica of the resist surface is produced by first forming a thin electrically conducting layer on the resist and by electroplating onto that layer a further layer of metal thick enough to be durable.
(5) The electroplated metal layer from the resist may then be stripped from the resist, although this is not essential.
(6) Forming an electroplated positive metal replica (to act as a master) from the negative metal replica (which constitutes the replicating tool).
(7) Forming a plastics replica from either the positive or directly from the negative metal replica.
(8) Depositing a thin metal film on the plastics replica. This metallised plastics replica provides a strongly absorptive surface, ready for writing, and constitutes the data storage medium, which may function for example as a digital or analogue information storage medium. Steps (7) and (8) can be repeated in a mass-production process.

Within the scope of the above process many variations are possible:
(Step 1) The resist may be for example photoresist or electron beam resist. It may be deposited for example by spinning, dipping, spraying or any other suitable technique.

The surface on which it is deposited may be flat or curved e.g. cylindrical, conical, spherical or other suitable shape.
(Steps 2/3) The pattern must satisfy the requirements set forth above in relation to the textured surface pattern of the data storage medium. The pitch need not be uniform. The pattern may be imaged onto the resist by any one of a variety of methods, including writing with an electron beam, or by the production of interference fringes either as a pattern of parallel bars or as two patterns of bars at an angle (possibly 90°) to each other. Laser interference is a valuable technique for generating an array of intersecting grooves or a set of concentric grooves. For example, two laser beams may be focussed in one dimension to form an interference pattern in the form of a series of spots. The resist-coated substrate may be moved (e.g. by rotation or translation or by a combination of rotation and translation) beneath this interference pattern to generate the desired exposure. Electron beam recording is another valuable technique which can be used with either the single spot recording or multiple spot recording techniques. Another recording technique of use in this invention involves recording harmonic fringes generated by a diffraction grating. The diffraction grating itself may have circular, spiral or straight-line rulings, and is illuminated with collimated light. This produces images in the form of harmonics of the grating at set distances from the grating, and these images result in exposure of the photoresist.

(Step 4) An alternative first stage is to produce a negative first stage replica using the techniques common in replication of ruled spectroscopic gratings e.g. first applying a very thin coat of a release agent such as mannitol to the original, and casting a layer of a thermosetting plastics against it. This technique causes minimum damage to the original, so that several first generation replicas may be obtained.

(Step 7) The product replica may be formed from the metal tool by any one of a number of proceeses including casting, injection or compression moulding or embossing, the last two using such details of technique as are well known in the arts of gramaphone record or videodisc manufacture.

Instead of using a resist which is exposed and developed in order to generate the desired textured surface pattern, steps (1)-(3) above can be replaced by a mechanical cutting or an optical cutting step which generates directly the desired textured surface pattern in a plastics or metal substrate. Mechanical cutting may be formed using a piezo-electrically driven stylus. Optical cutting can be achieved using UV lasers and appropriate optics or multiple spot techniques. Radial gratings may be produced by modulating the laser beam with such a technique. Cutting may also be effected directly using an electron beam.

In use the finished absorbent surface on the data storage medium is written by irradiating any desired area, typically with radiation from a laser which may be a diode laser. Sufficient energy density may be applied to alter permanently the surface. This alteration is evident as a change in the reflectivity or transmissivity of the surface and may be detected by any suitable electro-optic device.

Where the textured surface pattern comprises a crossed grating arrangement, the absorption of incident radiation when the data storage medium undergoes the writing (recording) process results in a degradation of the heat sensitive (generally plastics) material. This results in destruction of the local structure at points of incident radiation, which in turn causes a local change in the absorption characteristics of the material. Where the overcoating film is of gold, degradation of the underlying plastics material (giving reduced absorption) coincides with an increase in reflectivity. Where the overcoating film is of aluminum, the resultant reduced absorption corresponds to a change in transmissivity of the material. Thus in the first case (overcoating layer formed of gold) the data storage medium can be read by measuring its reflectivity, while in the second case (overcoating layer formed of aluminum) the data storage medium can be read by measuring transmissivity. However, by placing a reflective surface behind the data recording medium, data can be read in reflection.

Where the textured surface pattern consists of non-intersecting grooves, the surface absorbs incident radiation of a given polarisation only. The effect of absorbing such incident radiation is the same as described above in relation to a crossed grating type of structure. In order to read information carried on such a data storage medium, two techniques are available. In the first, radiation of the same type as used for writing information on the data storage medium, but of considerably reduced intensity, is used to read the information. In the second, the information on a data storage medium is read using a beam which is orthogonally polarised with respect to the beam which is used to write information on the data storage medium. Because of the nature of the textured surface pattern, the "read beam" will not be absorbed. As an example, if aluminum is used as the material for forming the thin overcoating layer, a recorded spot on the data storage medium would be seen as a spot of reduced reflectivity in the read beam.

In a different set of embodiments, the upper heat sensitive surface may be adjacent to a layer of even more heat sensitive material and, at lower power density than is needed to alter permanently the absorbent surface, a spot on the adjacent layer is heated by conduction. The adjacent heat sensitive layer may be of any form, for example it may be a low Curie point material so that Curie point writing may be used.

The reasons for the high absorption of incident electromagnetic writing radiation by data storage media in accordance with the present invention are not completely understood. However, one explanation is that the structuring of the surface in the form of protuberances creates a gradient in refractive index between air and the substrate. This results in a reduced reflectivity at the air material interface. Theoretical calculations of this have been made by Clapham & Hutley (Nature Vol. 244 No. 5414 pp 281-282 Aug. 3, 1973). Reduction in the reflectivity of a metal surface by providing a surface structure has been demonstrated by Wilson & Hutley (Optica Acta Vol. 29 No. 7 p. 1004, 1982).

An alternative explanation is that absorption in a roughened metal surface is effected by exciting surface plasmon waves in the metal. The grating structure allows strong coupling between the electromagnetic radiation and the surface plasmon waves. The theory predicts that the coupling is optimum for light radiation whose direction of vibration is perpendicular to the grooves.

BRIEF DESCRIPTION OF THE DRAWING

The above and other embodiments of the present invention may be more fully understood from the following detailed description taken together with the accompanying drawing in which.

DESCRIPTION OF THE PREFERRED EMBODIMENT

Figure 1:
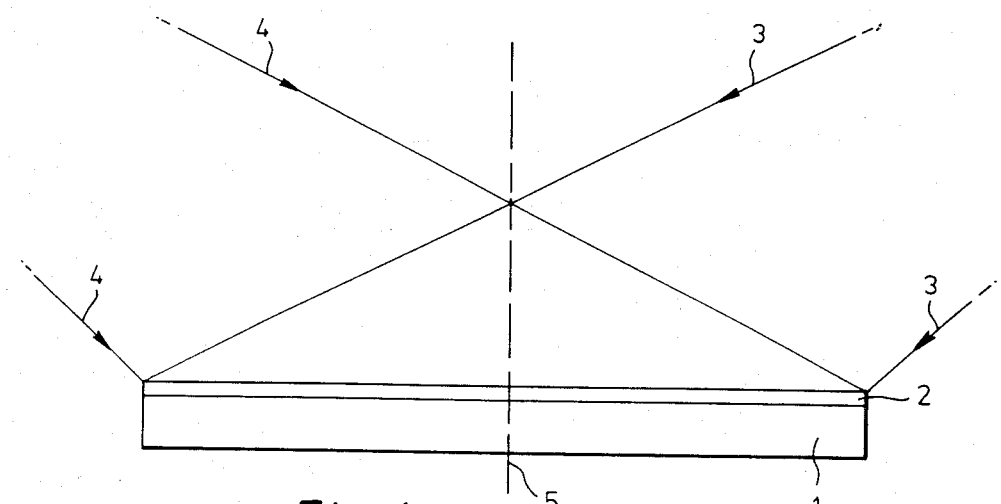
FIG. 1 is a side elevational view of a data storage medium.

There now follows a more specific description of how a suitably-patterned data storage medium may be produced, with reference to FIG. 1.

A flat, circular glass plate 1 is coated by spinning with a uniform coat 2 of Shipley Resist Microposit 1450B. The resist is exposed to two beams of light derived via a beam splitter and mirrors from the same laser. The beam splitter, lenses and mirrors are not shown as this method of setting up an interference field is well known to those skilled in the art. The wavelength and the angle between the two beams, which are illustrated by their bounding rays 3, 3 for one beam and 4, 4 for the other beam, are chosen to give fringes having a pitch in the region of 300 nm. The length of exposure is adjusted to give a depth of groove, after development, of at least 100 nm and preferably of about 200 nm. After exposure, the plate and resist, 1 and 2 are rotated through 90° about the axis 5 and again exposed. The resist is then developed.

After development a very thin film of silver is deposited chemically on the resist. Nickel is then electroplated onto the silver to a sufficient thickness to be robust. The nickel is then peeled off and placed as the tool in an embossing press. Thin sheets of PVC or of poly (methylmethacrylate) -PMMA- are placed in the press, heated, pressed, cooled and withdrawn. The plastic sheets are then coated, over the embossed surface, with a very thin evaporated film of gold. The thickness of the film may be estimated conveniently by the light transmission. A thickness of gold film which gives a light transmission of 10% is suitable. The resultant metal-coated plastics disks constitute blank data storage media which can be written-upon by the eventual user. However, it is to be understood that there can also be mass-produced a data storage medium which is written-upon either wholly or partially. This can be done by producing a patterned blank as described, writing upon the blank, and then employing the written-upon medium as the substrate from which to produce a tool for the subsequent mass production of metal-coated plastics disks.

Figure 2:
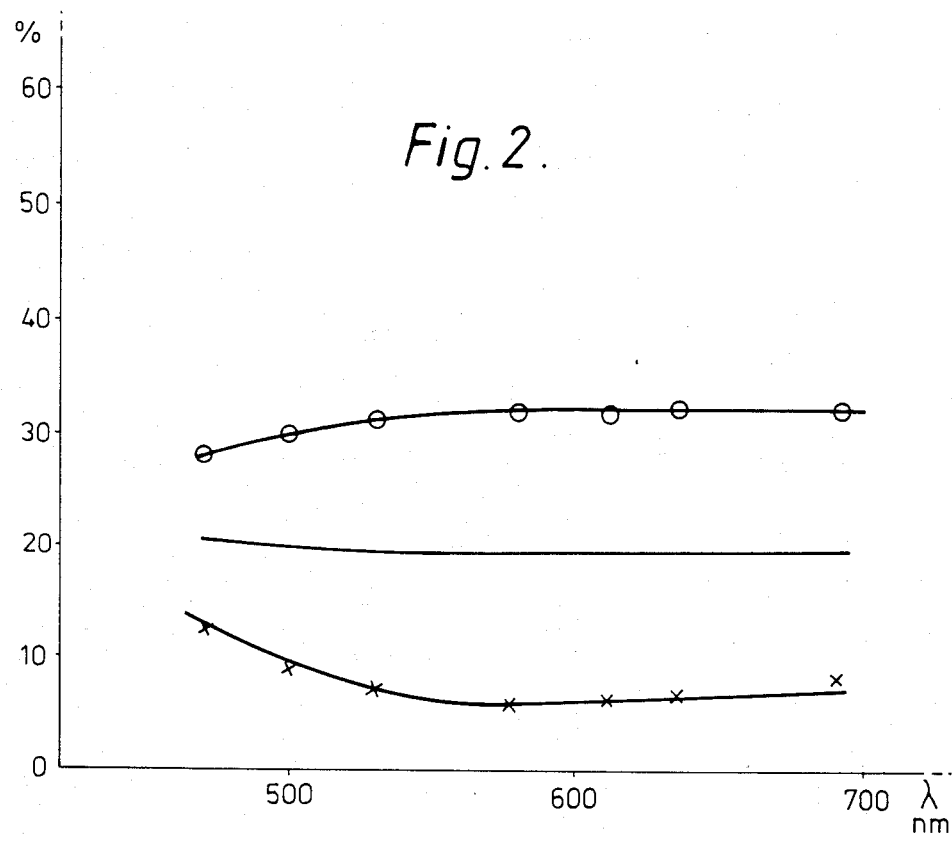
FIG. 2 is a graph of typical reflectivity.

Finally referring to FIG. 2 of the accompanying drawing, there is shown the typical reflectivity of a grating of single sine wave form. In the drawing, percentage reflection is plotted on the ordinate axis against wavelength of incident visible radiation, the grooves of the grating having a pitch of 330 nm and a height of 350 nm. The plots marked "O" indicate reflectivity with polarisation parallel to the grooves, the plots "X" indicate the reflectivity when polarisation is perpendicular to the grooves and the intermediate curve shows the mean reflectivity between the two first mentioned curves. It can be seen clearly from this drawing that when polarisation is perpendicular to the grooves, reflectivity is low, typically less than 10%, and the absorption correspondingly high, and when the radiation is polarised parallel to the grooves, reflectivity is high.

Having now reviewed the above description and the drawing, those skilled in the art will realize that a wide variety of embodiments may be employed in producing data storage medium in accordance with the present invention. In many instances, such embodiments may not even resemble that depicted here and may be used for applications other than that shown and described. Nevertheless, such embodiments will employ the spirit and scope of the invention as set forth in the following claims.

We claim:

1. A data storage medium having a surface or a surface region which is strongly absorbent of at least a predetermined band of wavelengths of electromagnetic radiation, whereby the surface or surface region can be written-upon by such radiation, the said surface or surface region including a layer of heat sensitive material which has a textured surface pattern which is a regular pattern comprising an arrangement of grooves or protuberances, the pitch of which is smaller than the shortest wavelength within said predetermined band of wavelengths, and the depth (peak-to-trough) of which pattern is at least 100 nm, the textured surface pattern being free from undercutting so as to be suitable for production or replication by moulding, casting, embossing or similar process against a tool, and the textured surface pattern being overcoated with a thin film of a material which has a high opacity at the predetermined band of wavelengths, information may be stored on said data storage medium by irradiating selected areas on the surface of said medium to heat underlying heat sensitive material and change the local reflectivity of the surface of the medium.

2. A data storage medium as claimed in claim 1, wherein said textured surface pattern extends over substantially one entire surface of the data storage medium.

3. A data storage medium as claimed in claim 1, wherein said textured surface pattern is present in one or more selected surface regions of the data storage medium.

4. A data storage medium as claimed in claim 1, wherein the heat sensitive material is a plastics material.

5. A data storage medium as claimed in claim 4, wherein the plastics material is one which undergoes a large volume change when degraded from the polymeric state to monomeric species.

6. A data storage medium as claimed in claim 5, wherein the plastics material is poly(methylstyrene), polyformaldehyde, polymethacrylic acid or a polymethacrylic ester.

7. A data storage medium as claimed in claim 4, wherein the plastics material is a polycarbonate, a polyester or poly(vinyl chloride).

8. A data storage medium as claimed in claim 1 wherein the textured surface pattern comprises an array of protuberances.

9. A data storage medium as claimed in claim 1 wherein the textured surface pattern comprises an arrangement of grooves.

10. A data storage medium as claimed in claim 9, wherein the textured surface pattern comprises an array of parallel grooves.

11. A data storage medium as claimed in claim 10, wherein the parallel grooves are of square cross-section.

12. A data storage medium as claimed in claim 10, wherein the parallel grooves are of triangular cross-section.

13. A data storage medium as claimed in claim 10, wherein the parallel grooves are of sinusoidal cross-section.

14. A data storage medium as claimed in claim 10, wherein the parallel grooves are of saw-toothed form.

15. A data storage medium as claimed in claim 9 wherein the textured surface pattern comprises an array of concentric grooves.

16. A data storage medium as claimed in claim 9 wherein the textured surface pattern comprises an array of radial grooves.

17. A data storage medium as claimed in claim 9 wherein the textured surface pattern comprises one or more spiral grooves.

18. A data storage medium as claimed in claim 9 wherein the textured surface pattern includes two sets of superimposed grooves.

19. A data storage medium as claimed in claim 18, wherein the two sets of grooves each consist of an array of parallel grooves, the textured surface pattern being in the form of a crossed grating.

20. A data storage medium as claimed in claim 19, wherein said two sets of grooves intersect orthogonally.

21. A data storage medium as claimed in claim 10, wherein the grooves have a configuration which is substantially a single sine wave.

22. A data storage medium as claimed in claim 1 wherein the pitch of the textured surface pattern is less than 300 nm.

23. A data storage medium as claimed in claim 1, wherein the depth of the textured surface pattern is at least 200 nm.

24. A data storage medium as claimed in claim 23, wherein the depth of the textured surface pattern is about 400 nm.

25. A data storage medium as claimed in claim 1, wherein the material which constitutes the high-opacity thin film is a metal.

26. A data storage medium as claimed in claim 25, wherein the thickness of said thin film is such as to give a transmission of no more than about 20%, preferably no more than 10%, of incident radiation over the predetermined band of wavelengths.

27. A data storage medium as claimed in claim 25, wherein said high-opacity material is gold or an alloy of gold.

28. A data storage medium as claimed in claim 25, wherein said high-opacity material is aluminum, chromium, titanium, or silver.

29. A data storage medium as claimed in claim 1, wherein the medium is in the form of a disk, rectangle or tape.

30. A pre-recorded data carrying medium formed by selective irradiation of a data storage medium as claimed in claim 1, the pattern or patterns of irradiation being such as to permit the stored data to be regenerated in visual form.

31. A data storage medium having a surface or a surface region which is strongly absorbent of at least a predetermined band of wavelengths of electromagnetic radiation, whereby the surface or surface region can be written upon by such radiation, the said surface or surface region including a layer of heat sensitive material which is a plastics material which undergoes a large volume change on degradation and which has a textured surface pattern in the form of a regular pattern comprising an arrangement of grooves or protruberances, the pitch of which is smaller than the shortest wavelength within said predetermined band of wavelengths, and the depth (peak-to-trough) of which pattern is at least 100 nm, the textured surface pattern being free from undercutting so as to be suitable for production or replication by moulding, casting, embossing or similar process against a tool, and the textured surface pattern being overcoated with a thin film of a material which has a high opacity at the predetermined band of wavelengths, whereby information may be stored on said data storage medium by irradiating selected areas on the surface of said medium to heat underlying heat sensitive material and change the local reflectivity of the surface of the medium.

32. A data storage medium having a surface or a surface region which is strongly absorbent of at least a predetermined band of wavelenghts of electromagnetic radiation, whereby the surface of surface region can be written upon by such radiation, the said surface or surface region including a layer of heat sensitive material which is a plastics material selected from the group consisting of poly(methylstyrene), polyformaldehyde, polymethacrylic acid, polymethacrylic esters, polycarbonate, polyesters and poly(vinyl chloride), and which has a textured surface pattern in the form of a regular arrangement of grooves or protruberances, the pitch of which is smaller than the shortest wavelength within said predetermined band of wavelengths, and the depth (peak-to-trough) of which pattern is at least 100 nm, the textured surface pattern being free from undercutting so as to be suitable for production or replication by moulding, casting, embossing or similar process against a tool, and the textured surface pattern being overcoated with a thin film of a metal which has a high opacity at the prdetermined band of wavelengths, whereby information may be stored on said data storage medium by irradiating selected area on the surface of said medium to heat the underlying heat sensitive material and change the local reflectivity of the surface of the medium.

* * * * *